May 13, 1958
R. ASHTON
2,834,633
OPERATOR'S CAB AND GRAIN TANK ARRANGEMENT FOR HARVESTERS
Filed Oct. 5, 1955
4 Sheets-Sheet 1
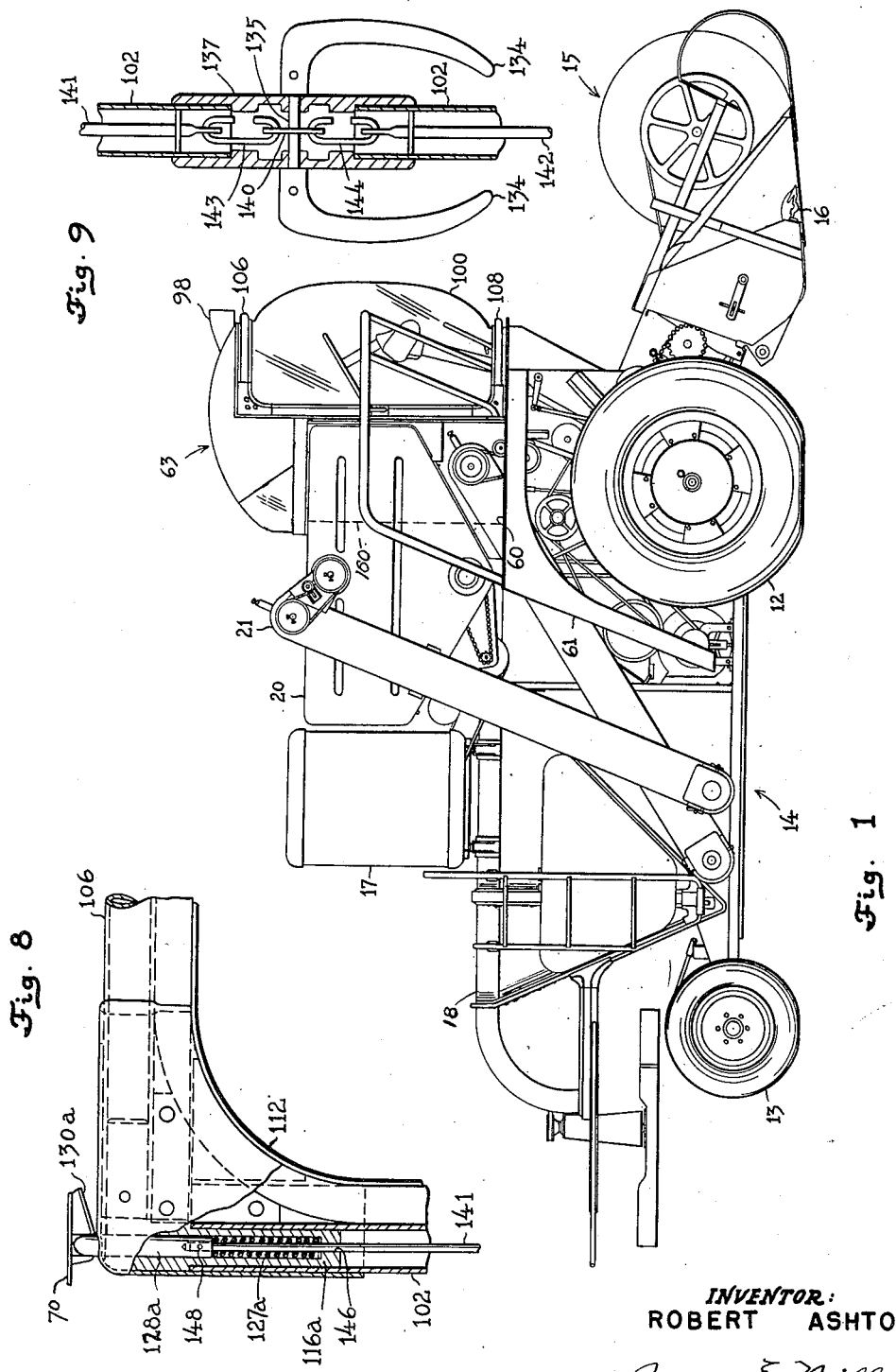
INVENTOR:
ROBERT ASHTON
by James E. Nilles
Attorney

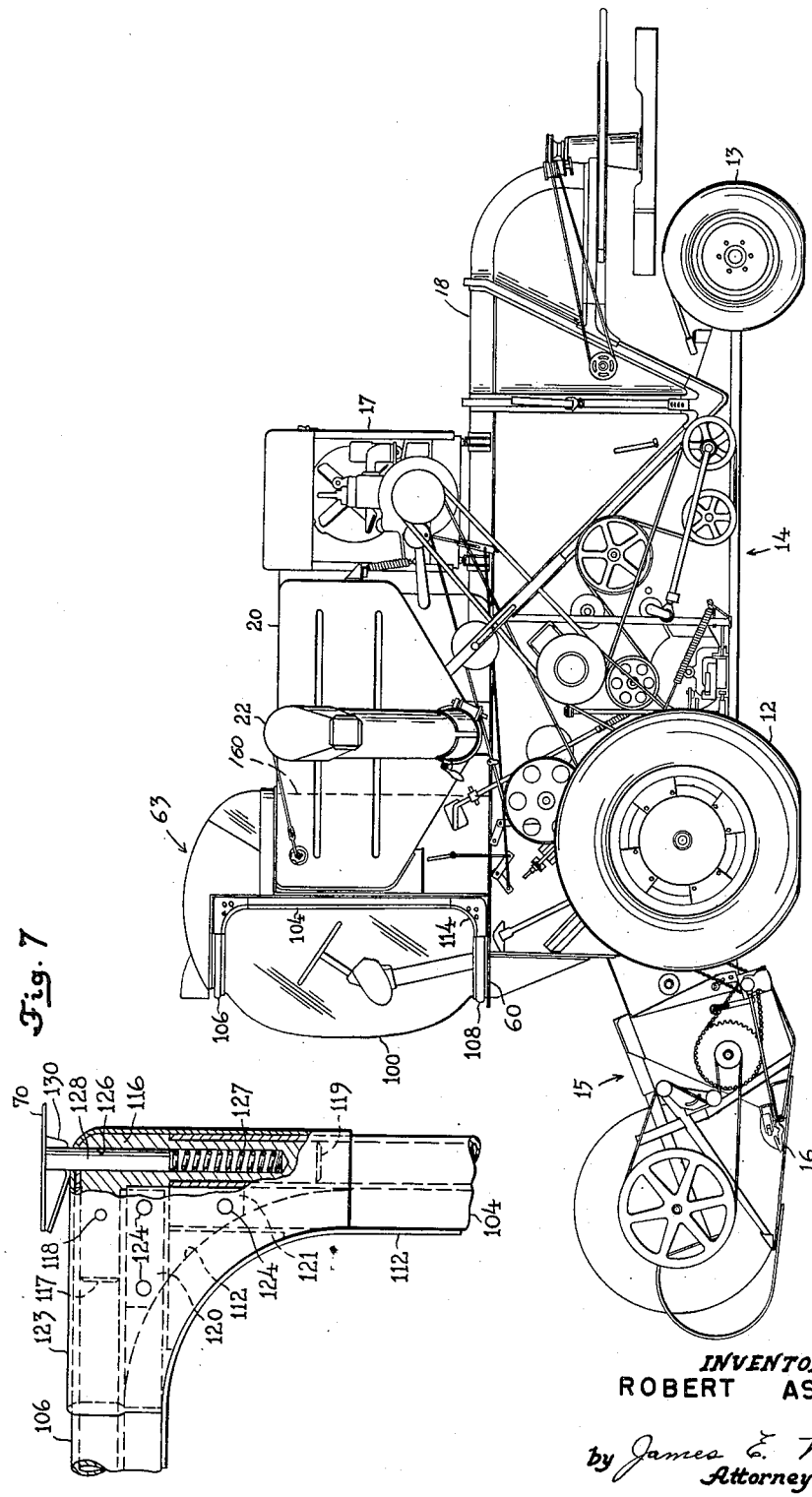

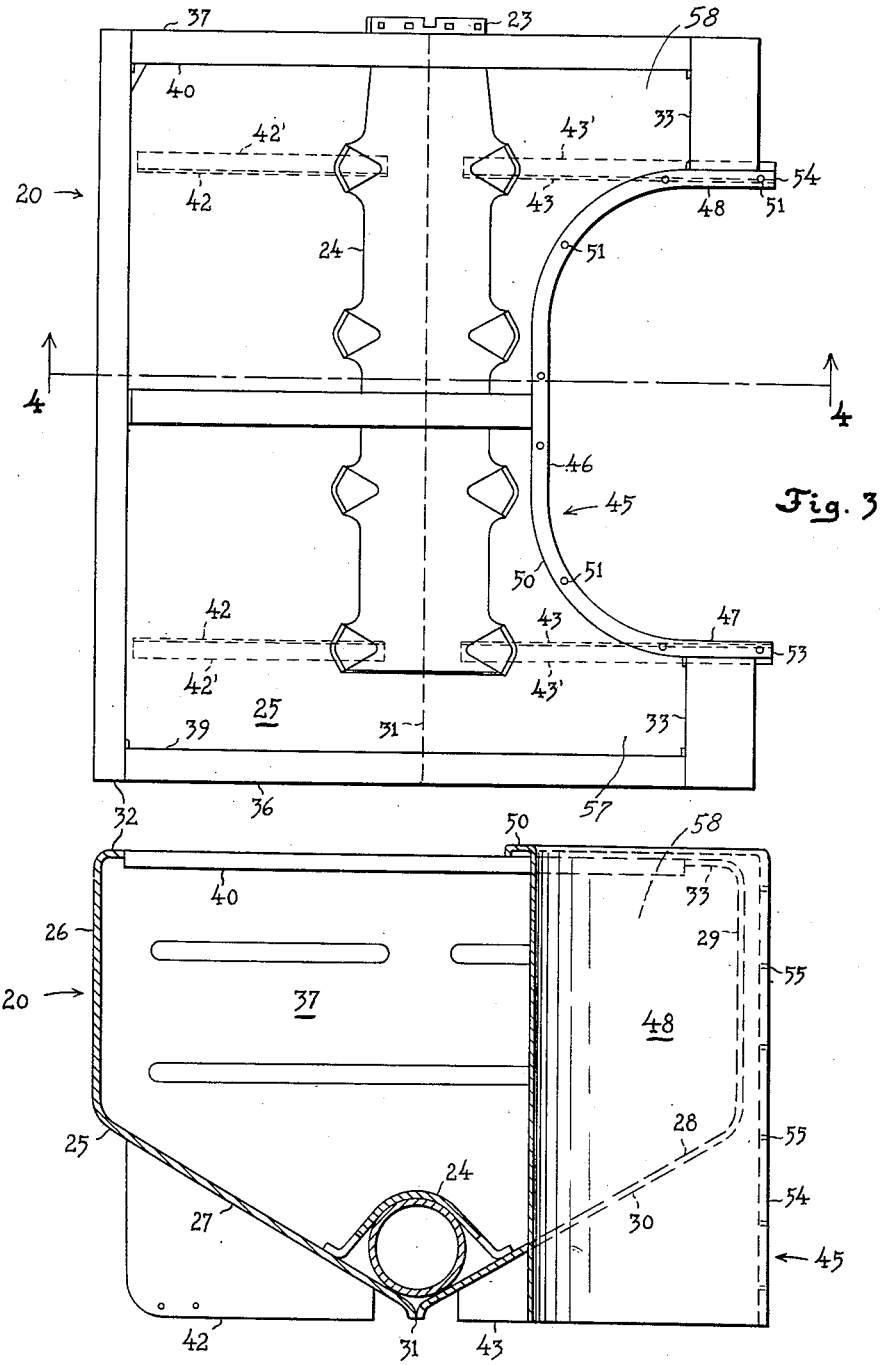

May 13, 1958
R. ASHTON
2,834,633
OPERATOR'S CAB AND GRAIN TANK ARRANGEMENT FOR HARVESTERS
Filed Oct. 5, 1955
4 Sheets-Sheet 4
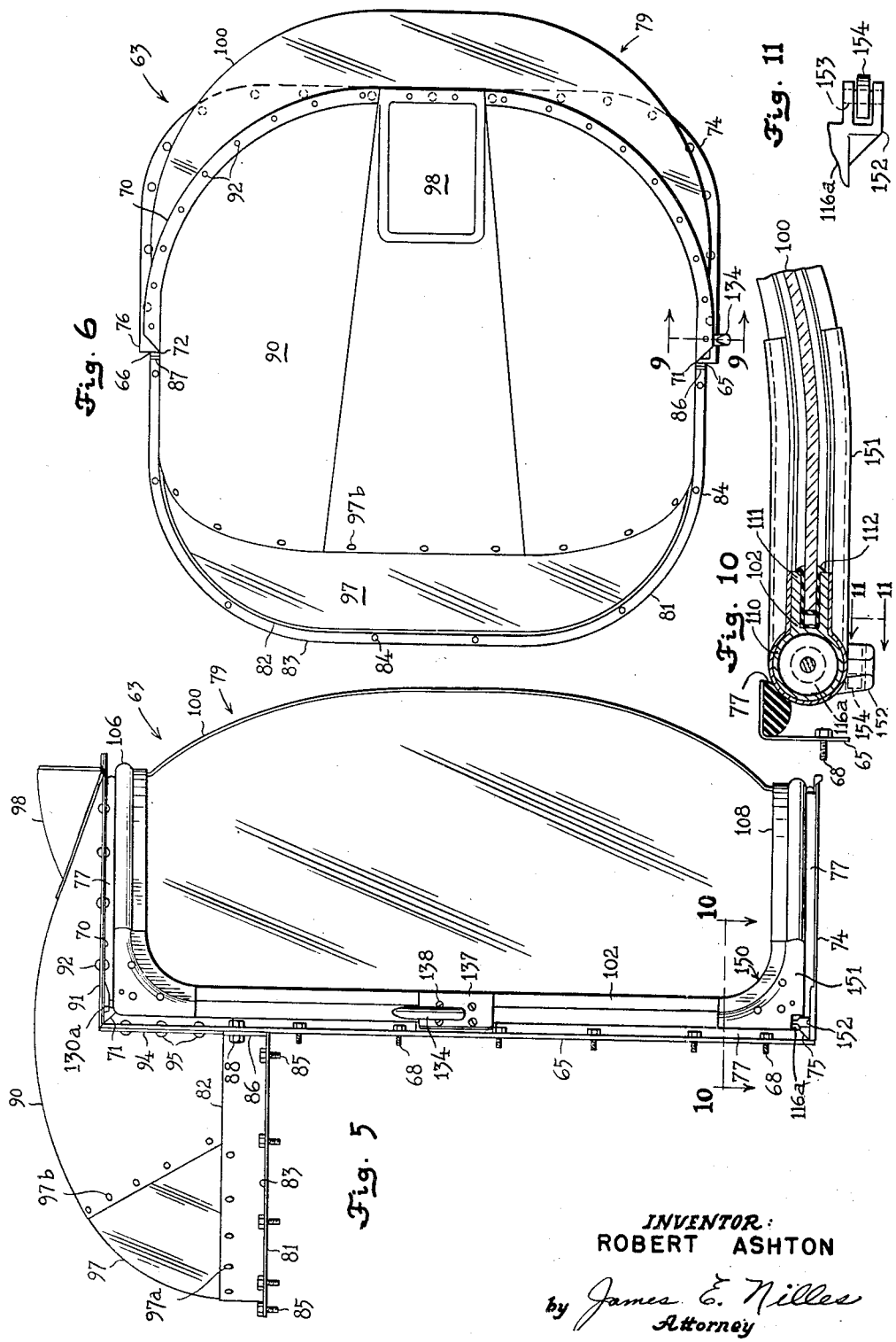
INVENTOR:
ROBERT ASHTON
by James E. Nilles
Attorney

United States Patent Office 2,834,633
Patented May 13, 1958

2,834,633

OPERATOR'S CAB AND GRAIN TANK ARRANGEMENT FOR HARVESTERS

Robert Ashton, Toronto, Ontario, Canada, assignor to Massey-Harris-Ferguson, Inc., Racine, Wis., a corporation of Maryland Application October 5, 1955, Serial No. 538,667

13 Claims. (Cl. 296—28)

This invention relates to harvesters and more particularly self-propelled harvesters which are adapted to store the crop being harvested, for example grain, in a suitable tank, from which it is periodically unloaded.

In a harvester of this type, it is desirable to position the operator's platform above the harvesting table and as close thereto as possible in order that the operator may have a clear and commanding view of the crop immediately in front of the cutting mechanism. By so positioning the operator he is able to efficiently adjust the height of the table and the ground speed of the combine to suit the crop conditions which vary throughout the field. In such a position, however, the operator is subjected to a considerable amount of chaff and dust which often "boils" about in the air around this area of the harvester.

Self-propelled harvesters, or combines, are of considerable size, frequently harvesting a swath of 16 feet in width, and are obviously hard to maneuver, for example, when turning around at the headland of a field. It is therefore desirable to keep the overall length of such a machine as small as practical and keep its weight, and consequently price, to a minimum. The amount of space formerly required for the operator's platform, with its numerous controls, and for the grain tank which must be of large capacity, was one factor which limited the reduction of the total length and weight of this type of machine.

It is therefore, an object of this invention to provide an operator's platform and grain tank arrangement, for a harvester of the above type, which is compact and which efficiently utilizes the space provided for it, said arrangement located on the harvester in an advantageous position as far as the operator's efficiency is concerned.

It is an object of this invention to generally improve the operator's platform and grain tank arrangement in a self-propelled harvester.

It is also an object of this invention to provide an enclosed cab for the operator which is advantageously located on the harvester and which is efficient in design in that it allows the operator full view of the critical areas around the machine and occupies a minimum amount of space.

It is another object of this invention to provide a grain tank for a self-propelled harvester which forms part of the operator's platform and in doing so also utilizes space around the platform which otherwise would be wasted.

Other objects and advantages will become more apparent as this disclosure progresses wherein a form of the invention is illustrated.

Figure 1 is a right side, elevational view of a combine embodying the invention.

Figure 2 is a left side, elevational view of the combine shown in Figure 1.

Figure 3 is a plan view of the grain tank shown in Figures 1 and 2 but on an enlarged scale.

Figure 4 is an elevational, cross sectional view taken on line 4—4 of Figure 3.

Figure 5 is a right side, elevational view of the cab shown in Figure 1, but on an enlarged scale.

Figure 6 is a plan view of the cab shown in Figure 5.

Figure 7 is a fragmentary, elevational view, partially in section, and on a further enlarged scale, of the hinge for the cab door shown in Figure 2.

Figure 8 is a fragmentary, elevational view, partially in section, and on a further enlarged scale, of the latch for the side of the cab door shown in Figures 1 and 5.

Figure 9 is an elevational, cross sectional view, on an enlarged scale, of the cab door handle, taken on line 9—9 of Figure 6.

Figure 10 is a sectional view, on an enlarged scale, taken on line 10—10 of Figure 5.

Figure 11 is an elevational view taken along the line 11—11 of Figure 10, and showing the door supporting roller.

Referring more particularly to the drawings, Figures 1 and 2 show a self-propelled harvester-thresher, more commonly referred to as a combine, which thas been chosen for purposes of illustrating the invention. The combine comprises the large front traction wheels 12 and the smaller rear steering wheels 13 which support the thresher portion, or body proper 14 of the combine for movement over the ground. The harvesting table or header 15 is pivotally secured to the body 14 in the well known manner and is vertically adjustable, relative the body, by the operator. This adjustment is made frequently so as to vary the height above the ground at which the crop is cut, depending on the condition of the crop, that is, whether it is standing or "down" or tangled, etc. The height of the table is also frequently adjusted to accommodate undulations of the ground. For instance, if the rear wheels 13 are on a high spot, or the forward wheels 12 drop into a gully, the table must be raised to prevent its forward edge, and particularly the cutting mechanism 16, from gouging into the ground. To reduce the frequency of making this adjustment as well as the amount of adjustment required, it is desirable to couple the table as closely as possible to the front wheels 12 which act, in effect, as gauge wheels. The body portion 14, contains the crop-treating mechanism (not shown), which in the case of the combine comprises the cylinder, straw walkers, grain pans, sieves, etc., which are all driven from the internal combustion engine 17 located on top of the body 14. The rear portion 18 of the body 14 is not as well reinforced as the rest of the body and therefore incapable of supporting heavy equipment such as the motor 17. Portion 18 forms a hollow chamber for the passage of treated crop material therethrough.

Grain tank

The grain tank 20 is also mounted on top of the body proper 14 and is usually located substantially over the large wheels 12, and centrally on the combine in a transverse direction, so as not to disturb the balance of the machine due to the weight difference in the loaded and unloaded condition. The conventional clean grain elevator 21 (Figure 1) delivers the crop from the body 14 to the tank 20. The unloading conveyor 22 (Figure 2) is connected to the outer end 23 (Figure 3) of the auger housing 24 for unloading the crop from the tank 20 in the well known manner. The grain tank 20 comprises a rear portion 25 which forms the rear side 26 and the rear half of the bottom 27 of the tank. The front portion 28 forms the front side 29 and the front half of the tank bottom 30. Portions 25, 28 are secured together along their bottom edges as by welding thus forming a rigid reinforcing flange 31. The upper edge of rear portion 25 is turned inwardly to form a reinforcing flange 32. Similarly the upper edge of front portion 28 is turned inwardly to form a reinforcing flange 33. Side walls 36, 37 are scured by welding at either end of the portions 25, 28 to form a substantially rectangular tank. Reinforcing channels 39, 40 are secured by welding along the upper edge of sides 36, 37, respectively and are also welded at their respective ends to flanges 32, 33. The tank 20 is supported on top of the body proper 14 by pairs of spaced sheet steel brackets 42, 43 which are preferably welded to the tank 20 and add considerable rigidity to its bottom. Brackets 42, 43 have horizontally disposed flanges 42', 43' respectively along their bottom edges which are secured to the top of body 14 by any suitable means, such as nuts and bolts (not shown). As best shown in Figure 3, a part of front portion 28 is cut away to snugly receive an upright and substantially U-shaped sheet metal wall 45 having a bight portion 46 and forwardly extending leg portions 47, 48. Wall 45 is welded to front portion 28 so as to form a grain holding tank. The channel shape of wall 45 strengthens the tank and makes it strong and rigid. The entire upper edge of wall 45 is turned outwardly to form a reinforcing flange 50 having a series of apertures 51 spaced therealong. The front edges of leg portions 47, 48 are also turned outwardly to form flanges 53, 54, respectively, each having a series of spaced apertures 55 along their length. Flange 50 forms a horizontal attaching portion and flanges 53, 54 form vertical attaching portions and the apertures 51 and 55 are for the purpose of receiving bolt means for securing the operator's cab to the tank as will more fully appear hereinafter. With this construction an exceptionally strong and relatively light weight tank has been provided. Grain storage portions 57, 58 of the tank are thus formed on either side of the U-shaped wall.

*Operator's cab*

An operator's platform 60 of sheet steel is located at the forward end of the top of body 14 and, as shown in Figures 1 and 2, is positioned directly above the table 15 and slightly to the rear thereof. A ladder 61 (Figure 1) at the right side of the combine leads to the platform. An operator's cab 63 is secured to the platform 60 at the approximate transverse center of body 14 and is also secured to flanges 50, 53 and 54 of tank 20 as will presently appear. The framework of the cab comprises a vertically positioned angle iron member 65, 66 (Figures 5 and 6) at either side of the cab and each having a series of spaced apertures through which extend bolts 68. Members 65, 66 form vertical attaching portions which mate with attaching portions 53, 54 of the tank and bolts 68 also extend through aligned apertures 55 of the grain tank for securing the cab thereto. An upper, generally semi-circular angle iron member 70 is secured, as by welding at 71, 72 to upright angle members 65, 66 respectively. A lower, generally semi-circular angle iron member 74 is welded at 75 to upright angle 65 and its other end 76 is similarly welded to the bottom end of upright angle member 66. Around the outer faces of angles 65, 66, 70 and 74 is cemented a rubber sealing strip 77 (Figures 5 and 10) which is semi-circular in cross-section. This strip 77 forms a seat against which the door 79 of the cab bears when in the closed position. The strip is effective to seal out dirt, dust and chaff and it also permits the door to be snugly held in place without rattling. The cab frame also includes a horizontally arranged angle iron member 81 which is of U shape as best shown in Figure 6. Angle 81 has a vertical flange 82 and a horizontal flange 83 having a series of spaced apertures 84 through which extend bolts 85. Flange 83 forms a horizontal attaching portion which registers with attaching portion 50 of the tank, and when the cab 63 is secured to tank 20 the bolts 85 extend through the aligned apertures 51 in flange 50. Nuts (not shown) engage bolts 68 and 85 and rigidly hold the cab and tank in assembled relationship. An ear 86, 87 formed integral with either end of angle 81 is secured to upright angles 65, 66, respectively by bolt means 88. A metal roof 90 is provided for the cab which has a horizontal flange 91 mating with angle 70 and secured thereto by rivets or bolt means 92. Roof 90 also has a vertical flange 94 (Fig. 5) on either side which is secured to the upright angles 65, 66 by rivets or bolt means 95. The rear portion 97 of the upper part of the cab is made of transparent material, such as formed Plexiglas, to afford visibility for the operator in rearward direction. Portion 97 is secured to vertical flange 82 by rivets 97a and to roof 90 by rivets 97b. The roof 90 is made of metal rather than a transparent material in order to keep out the sun's rays. An air inlet cover 98 is provided on the top forward portion of the cab and may contain a fan and heating unit. However, as this forms no part of this invention it is not described in detail.

The construction of the cab door 79 is shown in Figures 5 through 11. The framework of the door is formed largely from lightweight metal extrusions and the door itself consists of a generally semi-spherically shaped transparent member 100 which can be made of formed Plexiglas and which extends or "wraps around" the entire front side of the cab. This door affords the operator in the cab an unobstructed view of the entire harvester table and area in front of the machine as well as of the area a considerable distance on either side. The framework of the door is comprised of a vertical member 102 at the "handle side" of the door shown in Figure 5. A similar vertical member 104 is provided on the "hinge side" of the door shown in Figure 2. An upper semi-circular door frame member 106 and a similar lower member 108 are also provided. Members 102, 104, 106 and 108 are light weight metal extrusions having the same cross sectional shape as shown in Figure 10. This shape is made up of a tubular part 110 and a channel 111 along its forward edge in which is secured the flexible gasket 112. Gasket 112 extends entirely around the door frame and the door 100 is mounted within the gasket as shown in Figure 10. At the hinge side of the door (Figures 2 and 7) the frame members 104, 106 and 108 are held together at the upper and lower corners of the door by similar construction and only the upper corner construction as shown in Figure 7 will be described. The means for hinging the lower corner 114 to the platform 60 is the same as for the upper corner. An L-shaped metal casting 116 has a leg portion 117 which is circular in cross section and extends into the tubular portion of member 106 and is secured thereto by a pin 118. The other leg 119 extends into the tubular portion of member 104 and is similarly secured. Filler blocks 120 and 121 are inserted in the channel portions of members 106 and 104 and an L-shaped hollow corner piece 123, formed from a sheet metal stamping, covers the entire corner and the three rivets 124 secure the assembly together. A hole 126 is drilled in the casting 116 and a spring 127 in hole 126 urges the hinge pin 128 into engagement with a catch 130 secured to angle iron member 70. The door is thus hinged about hinge pin 128 and the corresponding pin (not shown) in the bottom corner 114 of the door. The door can be easily removed by forcing the pins 128 into their holes 126 and freeing them of their latch 130. At the other side of the cab door are provided handles 134 (Figures 5, 6 and 9) which are connected together by a shaft 135 which is square in cross section. A cover plate 137 is secured in a cut out portion of door member 102 by bolts 138. Shaft 135 extends through cover plate 137 and has a plate 140 mounted thereon for rotation therewith. An upper rod 141 and a lower rod 142 are connected with plate 140 by their respective links 143, 144. The construction of the corners of the door frame on the "handle side" are very similar to the corners of the "hinge side" except as follows. Rods 141, 142 extend through the tubular portion of member 102 and also through a hole 146 (Figure 8) in the inner ends of the L-shaped castings 116a. The outer end of rod 141 is connected to the pin 128a by a rivet 148. The lower corner 150 (Figure 5) on the handle side of the door is similar to the upper corner just described with one exception to be mentioned later. By turning the handles 134 from the position shown in the figures it will be apparent that rods 141, 142 will withdraw their respective locking pins 128a from their latches 130a against the action of their springs 127a to unlock the door. It will be seen that the entire door 100 is swung about the hinge pins 128 to permit ready access of the operator into the cab. As shown in Figures 5, 10 and 11, the lower corner 150 of the door differs from the upper corner in that the L-shaped casting 116a on the inside of the bottom hollow corner piece 151 has a projection 152 formed integrally therewith in which is rotatably mounted on axle 153 a supporting wheel 154. Wheel 154 rolls along the platform 60 when the door is being opened and acts to prevent it from sagging and assures smooth operation thereof.

*Résumé*

Referring to Figures 1 and 2, the forward and central portions of the body 14 are the load supporting portions. They are usually formed by a framework of angle and channel iron members. The amount of space on the topside of body 14 is very limited when it is desired to design a machine which is shorter, lighter and lower than usual.

By the construction and arrangement of the cab and tank of this invention, it will now be apparent that a very functional and efficient combination has been provided. The operator is located at the forward end of the body 14 and has a commanding view of the critical areas. The space at either side and at the rear of the cab is fully utilized by the grain tank which surrounds the cab at these locations. With a conventional tank this space would not be used, as efficiently at least. The cab is located in the area which would ordinarily be required by the conventional tank and thus necessitate moving the latter further rearwardly. However, with the present arrangement, the cab extends "into" the tank as indicated by the dotted lines 160 in Figures 1 and 2. The channel shaped wall 45 of the tank materially strengthens the tank and forms the back of the enclosed operator's cab. The cab makes provision for the necessary operator's visibility into the tank with which it forms a compact, integral and strong unit.

Having thus shown and described the invention, what is desired to be secured by Letters Patent is:

1. In a self-propelled harvester having a body, an operator's cab secured on top of said body at the forward end thereof, a grain tank also secured on top of said body and having a substantially U-shaped wall forming the rear side of said cab, said tank also having side walls which together with said U-shaped wall forms grain storage portions extending along either side of the rear side of said cab, means for rigidly and detachably securing said tank and cab together.

2. In a self-propelled harvester having a body, an operator's cab secured on top of said body at the forward end thereof, a grain tank also secured on top of said body and having a substantially U-shaped wall forming the rear side of said cab, said tank rigidly secured to said cab and having side walls which together with said U-shaped wall forms grain storage portions extending along either side of the rear side of said cab and forming a rigid and integral unit therewith.

3. In a self-propelled harvester having a body, an operator's cab secured on top of said body at the forward end thereof, a grain tank also secured on top of said body and having a substantially U-shaped vertical wall at its forward side forming the rear side of said cab, said tank also having side walls which together with said U-shaped wall forms grain storage portions extending along either side of the rear side of said cab.

4. A device as defined in claim 3 further characterized in that said U-shaped wall has horizontal and vertical attaching portions adapted to be rigidly secured to said cab.

5. In a self-propelled harvester having a body, an enclosed operator's cab secured on top of said body at the forward end thereof, said cab having a door extending around its forward side, said cab also having attaching portions to the rear of said door, a grain tank also secured on top of said body and having a substantially U-shaped wall at its forward side forming the rear side of said cab, said tank also having side walls which together with said U-shaped wall forms grain storage portions extending along either side of the rear side of said cab, said U-shaped wall having attaching portions which are adapted to register with and be secured to said cab attaching portions whereby said cab and tank form a rigid integral unit.

6. In a self-propelled harvester having a body, an operator's cab secured on top of said body at the forward end thereof, a generally U-shaped grain tank also secured on top of said body adjacent the rear of said cab, said tank having a bight portion which forms the rear of said cab, said tank also including side walls which together with said portion forms grain storage leg portions which extend adjacent either side of said cab.

7. A device as defined in claim 6 further characterized in that said cab and tank have attaching portions which are adapted to be in registry and secured together to form a rigid integral cab-tank unit.

8. A grain tank for a self-propelled harvester comprising a rear wall, side walls and a front wall, said walls generally coextensive in height so as to form an open top through which grain may be delivered, said front wall comprising a generally U-shaped wall adapted to receive an operator for said harvester.

9. A device as defined in claim 8 further characterized in that said U-shaped wall has attaching portions adapted to be rigidly secured to an operator's cab for forming a compact, integral and rigid unit therewith.

10. As an article of manufacture, a cab for a self-propelled harvester having a grain tank secured on top of said harvester, said cab comprising, a frame structure having generally vertical and horizontal attaching flange portions which are adapted to be rigidly secured to said grain tank to form a rigid unit therewith, a generally semi-spherical shaped transparent door hingedly mounted on said frame structure whereby an operator has easy access to said cab and good visibility to the front and to either side of said cab.

11. A grain tank for a self-propelled harvester including, a rear wall, side walls and a generally vertical and substantially U-shaped front wall extending between said side walls, said side walls and said front wall forming grain storage leg portions at either side, said U-shaped front wall adapted to receive an operator for said harvester said walls all being substantially coextensive in height to define an open top.

12. In a self-propelled harvester having a body, an operator's cab secured on top of said body at the forward end thereof, an open top grain tank also secured on top of said body and having a generally channel shaped wall forming the rear side of said cab, said tank also having side walls which together with said channel shaped wall forms grain storage portions extending along either side of the rear side of said cab.

13. In a self-propelled harvester having a body, an enclosed operator's cab secured on top of said body at the forward end thereof, said cab having a door extending around its forward side and hinged at one side thereof, said cab also having attaching portions to the rear of said door, a grain tank also secured on top of said body and having a channel shaped wall at its forward side forming the rear side of said cab, said tank also having side walls which together with said channel shaped wall forms grain storage portions extending along either side of the rear side of said cab, said channel shaped wall having attaching portions which are adapted to register with and be secured to said cab attaching portions whereby said cab and tank form a rigid integral unit.

References Cited in the file of this patent

UNITED STATES PATENTS

| | | |
|---|---|---|
| 1,803,866 | Patterson | May 5, 1931 |
| 2,007,295 | Coble | July 9, 1935 |
| 2,471,295 | Wehr | May 24, 1949 |
| 2,533,772 | DeFrees | Dec. 12, 1950 |